March 1, 1966
A. G. BOSE
3,238,412
ELECTRICAL APPARATUS FOR MEASURING PROBABILITY
DISTRIBUTIONS OF COMPLEX WAVES
Filed July 10, 1961
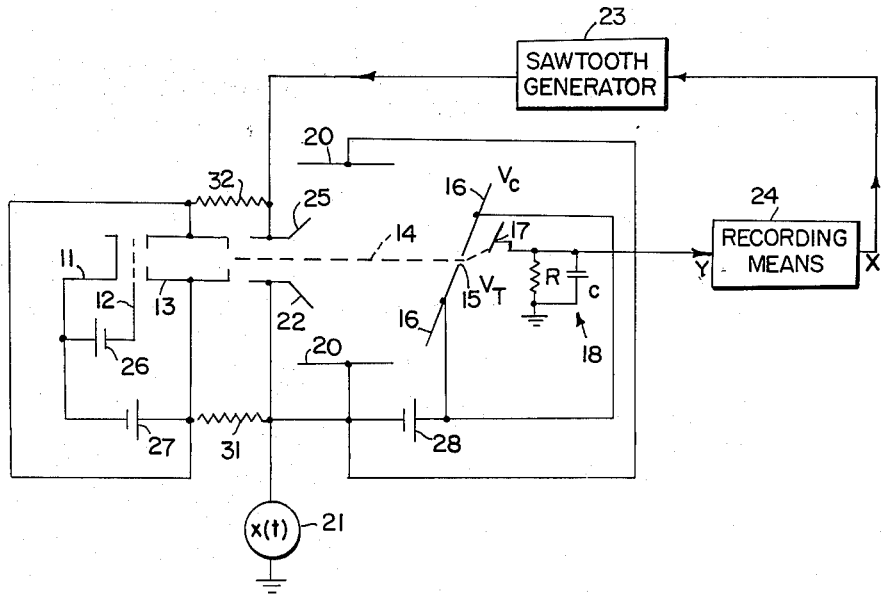
INVENTOR.
AMAR G. BOSE
BY
Charles Hieken
ATTORNEYS ＃ 3,238,412
ELECTRICAL APPARATUS FOR MEASURING PROBABILITY DISTRIBUTIONS OF COMPLEX WAVES
Amar G. Bose, 126 Sherman Road, Chestnut Hill 67, Mass.
Filed July 10, 1961, Ser. No. 122,790
4 Claims. (Cl. 315—12)

The present invention relates in general to electrical apparatus and more particularly concerns novel methods and means especially useful in connection with measuring probability distributions in the manner generally described in the copending application of Amar G. Bose entitled Signal Translation filed Nov. 16, 1956, Serial No. 622,685. Details of an actual working model of the present invention and results obtained therewith are disclosed in a thesis of Robert W. Burton entitled A Probability Analyzer Utilizing Secondary Emission submitted for partial fulfillment of the requirement for the Electrical Engineer degree at the Massachusetts Institute of Technology under the supervision of this applicant and available at the M.I.T. Engineering Library since August 1960.

The present invention represents an improvement over probability density measuring techniques described in the above-identified copending application. A feature of the technique there described resided in relatively simple apparatus rapidly providing an accurate indication of the probability density of a signal waveform having spectral components of a frequency as high as those which the deflection plates of a cathode ray tube can accept. That tube comprised an electron gun, at least one pair of deflection plates, a plate for collecting secondary emitted electrons, at least one secondary electron emitting target electrode and an integrating network connected to the target strip for developing a potential related to the average value of the time the electron beam was directed upon the target electrode. By applying the signal whose probability was to be measured to the deflection plates, the signal developed across the integrating circuit was representative of the probability of the particular amplitude required to deflect the beam so that it impinged upon the target electrode connected to that integrating circuit.

While that system performed well in many applications, a difficulty was discovered when the beam hit the secondary emitting target electrode at a particular angle. If this particular angle were established by controlling the static potential across the deflection plates, the beam would suddenly jump to a different position, usually away from the target electrode. It was believed that the cause of this instability was a result of secondarily emitted electrons from the target strip having enough energy to reach the deflection plates. These electrons produced unequal currents in the plates. While these currents were small, the high impedance circuit driving the plates could develop enough potential difference across the plates from this small current to produce the observed sudden deflection.

Accordingly it is an important object of the present invention to eliminate the problem described immediately above.

According to the invention, the problem is solved by establishing a field between the collector and target electrodes so that the primary electrons from the beam are incident upon the target electrode with a substantial component generally tangential to the surface of the target electrode. A feature of this arrangement is that this type of incidence also increases the secondary emission ratio.

Numerous other features, objects and advantages of the invention will become apparent from the following specification when read in connection with the accompanying drawing, the single figure of which shows a combined schematic, pictorial representation and block diagram generally illustrating the logical arrangement of a preferred embodiment according to the invention.

With reference to the drawing, there is shown a conventional cathode ray tube triode electron gun having a cathode 11, control grid 12, accelerating anode 13 and dag coating 20 for providing an electron beam 14 which passes through the aperture 15 in collector electrode 16 to impinge upon target electrode 17 at an angle with the normal to the electrode 17, thereby producing a potential across integrating network 18 representative of the probability density of the signal $x(t)$ provided by source 21 to lower deflection plate 22. A sawtooth generator 23, synchronized with the abscissa X of a point whose oridinate Y is then being recorded by recording means 24 displaced from the X axis a distance Y representative of the probability of that value X then indicated by the integrating circuit 18, delivers a biasing signal to upper plate 25 representative of the value X whose probability point is then being recorded. Appropriate biasing potentials are delivered to the different electrodes by means of a conventional D.-C. power source, schematically represented by the batteries 26, 27 and 28, deflection plates 22 and 25 being maintained at substantially the same potential as accelerating anode 13 through the resistors 31 and 32, respectively. Suitable beam centering means and focusing means may also be provided, but since these techniques are so well known in the cathode ray tube art, specific centering circuits and focusing means are not shown so as not to obscure the principles of the invention.

The schematically represented collector 16 may be a circular disc mounted in the glass envelope of the tube and formed with a small aperture 15 on the tube axis, the disc being preferably tilted with respect to the tube axis as shown. Target strip 17 is preferably oriented generally parallel to collector 15 as shown, displaced from the axis of the tube so that it is outside the shadow of the aperture created by a light source placed at the apparent point source of the electron beam. Its dimension in the direction of deflection should correspond to the increment of input signal potential sought to be be resolved in obtaining the probability density curve. That is, if it is desired to resolve probabilities by 0.1 volt increments, this dimension of target strip 17 should preferably be such that a change in 0.1 volt across deflection plates 22 and 25 displaces the electron beam from one edge of aperture 15 to the other.

Target 17 is preferably made of oxidized beryllium copper because of its high secondary emission ratio. The collector 16 may be made of stainless steel with an aquadag coating on the gun side. The aquadag coating 20 on the inside walls of the tube is maintained substantially at anode potential to help maintain a substantially field-free region between the deflection plates and the collector 16.

The potential on target electrode 17 should be less than the potential on collector electrode 16. The magnitude of this potential depends upon the velocity of electrons entering aperture 15, the orientation of the collector electrode 16 and the target electrode 17. It is selected so that with the beam 14 centered on the axis and passing through aperture 15, the field between collector electrode 16 and target electrode 17 alters the path of electrons from aperture 15 so that they impinge upon target electrode 17 at an angle slightly less than 90° with respect to a normal to the surface of target electrode 17. This may be determined experimentally by adjusting the deflection potentials on plates 22 and 25 so that they are equal, thereby causing the beam to travel along the axis and pass through the aperture 15. The potential difference between collector electrode 16 and target electrode 17 is then adjusted while measuring the current flowing through resistor R (or the voltage across this resistor) as it gradually increases and reaches a maximum. The potential is then reduced slightly below this value to insure that a sudden fluctuation in electrode potentials does not result in the field between collector electrode 16 and target electrode 17 being so strong that the electron beam is curved back on collector electrode 16 and misses target electrode 17 completely.

It can be shown that if the collector plate 16 is tilted at an angle of 45° relative to the tube axis and the separation between collector plate 16 and target electrode 17 is $d$, the beam will follow a parabolic path upon passing through aperture 15 and be just tangential to target electrode 17 at a point $2d$ away from the projection of the center of the aperture 15 and the plane including target electrode 17 if the potential difference between collector plate 16 and target electrode 17 is substantially one-half the potential difference between the electron gun cathode 11 and the collector plate 16.

This choice of structure and potential achieves a number of advantages. First, collector electrode 16 blocks secondarily emitted electrons from target electrode 17 from reaching the deflection plates. Second, the angle of emitted secondary electrons is such that even without target electrode 16 blocking them from the deflection plates, the normal course of these electrons is toward the aquadag. Third, deflecting the beam so that primary electrons strike the secondarily emitting surface on target electrode 17 at near tangential incidence increases the secondary emission ratio and the sensitivity of the apparatus.

When using the structure according to the invention for making probability density measurements, the recording means 24 may be a conventional graphical pen recording means. The output of the integrating network 18 is applied to the pen deflection circuits corresponding to the Y deflection. The drive used for displacing the recording medium along the X axis may be used to turn a potentiometer comprising sawtooth generator 23 and thus cause a linear rise in the potential across deflection plates 22 and 25 corresponding to the contemporaneous X position of the recording pen and thereby selected the probability of $x(t)$ for that particular X.

For best results the period of the sawtooth generated by sawtooth generator 23 is much greater than the time constant RC of integrating network 18 to insure that the network performs the required integration for each value of X. The time constant RC is in turn large compared to a period of the lowest frequency of interest in the signal $x(t)$ being analyzed. The peak-to-peak amplitude of the waveform generated by sawtooth generator 23 preferably embraces the range of possible amplitudes assumed by the signal waveform $x(t)$ being analyzed.

The exemplary embodiment of the invention has been described with respect to a single target electrode and a single pair of deflection plates. However, the principle of the invention are applicable to a system having a number of target electrodes and more than one pair of deflection plates. For example, if a pair of horizontal deflection plates were also employed to deflect the beam and a signal $y(t)$ applied across these plates, the signal developed across integrating circuit 18 would be representative of the joint probability of $x(t)$ and $y(t)$.

There has been described novel methods and means for accurately making probability density measurements on signals having exceptionally high frequency spectral components with relatively simple apparatus automatically. It is evident that those skilled in the art may now make numerous modifications of and departures from the specific apparatus described herein without departing from the inventive concepts. Consequently, the invention is to be construed as limited only by the spirit and scope of the appended claims.

What is claimed is:
1. Electrical apparatus comprising,
an electron gun including means for emitting a beam of electrons along an axis,
at least a pair of opposed deflection plates embracing said axis for deflecting said beam,
an apertured collector plate inclined at an angle with respect to said axis and formed with an aperture embracing said axis and said beam, and
a target electrode essentially parallel to said collector plate and displaced from said axis in a region outside a cylinder coextensive with said aperture and surrounding said axis,
said apertured collector plate being opaque to any of the possible straight line electron trajectories between said target electrode and said deflection plates while being positioned to collect secondarily emitted electrons from said target electrode when the latter intercepts said beam of electrons.

2. Electrical apparatus in accordance with claim 1 wherein said electron gun has a cathode and said collector plate is tilted at an angle of 45° with respect to said axis and further comprising,
means for establishing an essentially field free region between said deflection plates and said collector plate,
means for establishing a first potential between said cathode and said collector plate,
and means for establishing the potential between said collector plate and said target electrode as substantially one-half that of said first potential.

3. Electrical apparatus comprising,
a source of an electron beam including means for emitting said beam along an axis,
means for electrostatically deflecting said beam,
a target electrode displaced from said axis and responsive to said beam for emitting secondary electrons,
a collector electrode interposed between said target electrode and said deflecting means formed with an aperture embracing said electron beam and said axis for receiving said secondarily emitted electrons and preventing said secondarily emitted electrons from reaching said deflecting means,
means for applying a deflection potential to said deflecting means to cause said electron beam to strike said target electrode,
means for maintaining the angle of incidence between said electron beam and said target electrode to a value causing said secondarily emitted electrons to follow a normal path embracing a region outside said deflecting means,
an integrating circuit connected to said target electrode for developing a signal representative of the time said beam impinges upon said target electrode,
a source of an external signal having spectral components of interest above a prescribed low frequency,
means for coupling said external signal source to said deflecting means to deflect said electron beam in accordance with the contemporary amplitude of said external signal,
said integrating circuit being characterized by a time constant which is long compared to the period of said prescribed low frequency,
a source of a time varying biasing signal for altering the deflection potential on said deflecting means through a range of potentials embracing the amplitude range of said external signal,
said biasing signal being varied through said range in a time interval long compared to said time constant,
and means for applying said time varying biasing signal to said deflection means so that the contemporary signal across said integrating circuit is representative of the probability of said external signal assuming the amplitude represented by the contemporary value of said time varying biasing signal.

4. Electrical apparatus in accordance with claim 3 and further comprising display means responsive to said integrating circuit signal for providing a graphical representation of said last-mentioned probability by indicating a point characterized by an ordinate value corresponding to said last-mentioned probability and an abscissa corresponding to said last-mentioned amplitude.

References Cited by the Examiner

UNITED STATES PATENTS

| | | | |
|---|---|---|---|
| 2,578,527 | 12/1951 | Farren et al. | 332—11 |
| 2,581,612 | 1/1952 | Thompson | 315—12 |
| 2,678,350 | 5/1954 | Eaglesfield | 332—11 |
| 2,733,410 | 1/1956 | Goodall | 332—11 |
| 2,787,764 | 4/1957 | Bjorkman | 332—13 |
| 2,841,727 | 7/1958 | Jensen et al. | 313—68 |

DAVID G. REDINBAUGH, *Primary Examiner.*

RALPH G. NILSON, *Examiner.*